United States Patent [19]
Imagawa

[11] Patent Number: 5,677,363
[45] Date of Patent: Oct. 14, 1997

[54] WATER BASED ERASABLE INK COMPOSITIONS

[75] Inventor: Kiyotaka Imagawa, Osaka, Japan

[73] Assignee: Sakura Color Products Corporation, Osaka, Japan

[21] Appl. No.: 379,115

[22] Filed: Jan. 27, 1995

Related U.S. Application Data

[63] Continuation of Ser. No. 124,581, Sep. 22, 1993, abandoned, which is a continuation of Ser. No. 32,157, Mar. 12, 1993, Pat. No. 5,561,175, which is a continuation of Ser. No. 653,262, Feb. 11, 1991, abandoned, which is a division of Ser. No. 569,764, Aug. 22, 1990, Pat. No. 5,004,763, which is a continuation of Ser. No. 288,578, Dec. 22, 1988, abandoned.

[30] Foreign Application Priority Data

Dec. 25, 1987 [JP] Japan .................. 62-331021
Nov. 15, 1988 [JP] Japan .................. 63-288235
Nov. 15, 1988 [JP] Japan .................. 63-288238

[51] Int. Cl.$^6$ .................................. C09D 11/10
[52] U.S. Cl. .................. 523/161; 524/563; 524/564; 260/DIG. 38
[58] Field of Search .................. 523/161; 524/563, 524/564; 106/19 A, 20 A, 21 A, 20 R, 22 R, 23 R; 260/DIG. 38

[56] References Cited

U.S. PATENT DOCUMENTS

| | | | |
|---|---|---|---|
| 3,834,823 | 9/1974 | Seregely et al. | 401/198 |
| 3,949,132 | 4/1976 | Seregely et al. | 428/207 |
| 4,297,260 | 10/1981 | Ferree, Jr. et al. | 523/161 |
| 4,367,966 | 1/1983 | Williams et al. | 401/190 |
| 4,419,464 | 12/1983 | Williams et al. | 523/161 |
| 4,940,628 | 7/1990 | Lin et al. | 428/207 |
| 5,217,255 | 6/1993 | Lin et al. | 281/15.1 |

*Primary Examiner*—Paul R. Michl
*Assistant Examiner*—John J. Guarriello

[57] ABSTRACT

A water base erasable ink composition which comprises:

(a) water as a solvent in amounts of 50–90% by weight;

(b) a coloring agent dispersed or dissolved in water in amounts of 1–30% by weight;

(c) an aqueous emulsion of at least one nonvolatile or only slightly volatile compound which is liquid at room temperatures and is selected from the group consisting of aliphatic carboxylic acid esters, higher hydrocarbons and higher alcohols in dry amounts of 1–20% by weight; and (d) a water soluble resin or a water-solubilized resin which is film forming at room temperatures in amounts of 0.1–15% by weight. The water soluble resin or water-solubilized resin may be displaced by an aqueous emulsion or a hydrosol of water insoluble resins.

17 Claims, No Drawings

WATER BASED ERASABLE INK COMPOSITIONS

This application is a continuation of Ser. No. 08/124,581 filed Sep. 22, 1993, now abandoned, which is a continuation of Ser. No. 08/032,157 filed Mar. 12, 1993, now U.S. Pat. No. 5,561,175, which is a continuation of Ser. No. 07/653,262 filed Feb. 11, 1991, now abandoned, which is a division of Ser. No. 07/569,764, filed Aug. 22, 1990, now U.S. Pat. No. 5,004,763, which is a continuation of Ser. No. 07/288,578 filed Dec. 22, 1988, now abandoned.

This invention relates to a water base erasable ink composition for use in writing with a marking pen which forms readily erasable writings on an impervious writing surface.

There is already known a variety of ink compositions for use in writing with a marking pen which forms on an impervious writing surface, such as of enamel, resin or metal, writings erasable by wiping lightly with dry cloth or paper. These erasable ink compositions usually contain an additive called a separating agent together with an organic solvent, a pigment and a resin.

For example, there is described in Japanese Patent Publication No. 62-9149 an erasable ink composition which contains an aliphatic dibasic carboxylic acid diester and an aliphatic monobasic carboxylic acid ester together with a surfactant, a polyester resin and a saturated fatty acid triglyceride dissolved in an organic solvent.

Like the above exemplified erasable ink composition, most of the conventional erasable ink compositions contain ketones or alcohols as an organic solvent, among which ketones are very toxic. Methanol is also toxic and smells bad. Ethanol is less toxic, but expensive.

On the other hand, a water base erasble ink composition is also known which contains a resin emulsion such as a polyvinyl acetate emulsion as a separating agent together with a dyestuff or a pigment as a coloring agent, and a surfactant. However, when writings are formed with such an ink composition on an impervious surface and dried, the resin emulsion forms a continuous adhesive film on the impervious surface, as is the case with a so-called known strippable paint. Consequently the writing is not so easily separated or erased from the surface by light wiping. Moreover, when the writing is rather strongly wiped, it is separated as a continuous film from the surface. Namely, even when the writing is wiped only at a part thereof, it often happens that the entire writing is separated from the writing surface.

The present inventors have made intensive investigations to solve the above-mentioned problem involved in the prior erasable ink compositions, either water base or oil base, and found that a water base ink composition which contains a specific combination of a separating agent and a water soluble resin provides writings on an impervious surface which can be readily erased only at wiped portions.

Therefore, it is an object of the invention to provide a water base erasable ink composition for use in writing with a marking pen which forms writings readily erasable only at wiped portions.

According to the invention, there is provided a water base erasable ink composition which comprises:

(a) water as a solvent in amounts of 50–90% by weight;

(b) a coloring agent dispersed or dissolved in water in amounts of 1–30% by weight;

(c) an aqueous emulsion of at least one nonvolatile or only slightly volatile compound which is liquid at room temperatures and is selected from the group consisting of aliphatic carboxylic acid esters, higher hydrocarbons and higher alcohols in dry amounts of 1–25% by weight; and (d) a water soluble resin or a water-solubilized resin which is film forming at room temperatures in amounts of 0.1–15% by weight.

Water is used as a solvent in the ink composition of the invention, and is contained usually in amounts of 50–90% by weight, preferably in amounts of 60–80% by weight.

As a coloring agent, any pigment may be used, and the pigment usable includes, for example, carbon black, phthalocyanines such as copper phthalocyanine blue, azo pigments, quinacridones, anthraquinones, dioxazines, indigos, thioindigos, perynones, perylenes, indolenones and azo-azomethines.

A variety of aqueous pigment dispersions is commercially available, and they may be preferably used in the invention. The dispersion usually contains a dispersant or a surfactant, so that the ink composition of the invention may contain such a dispersant or a surfactant when the dispersion is used in the ink composition. The dispersant is usually a polymeric one and is contained in the dispersion usually in amounts of 1–300 parts by weight, preferably in amounts of 5–100 parts by weight, per one part by weight of pigments. A dyestuff may also be used as a coloring agent, preferably a water soluble dyestuff.

The content of coloring agents in the ink composition may be selected depending upon the agent used or the darkness of writings required. However, when the content of coloring agents is too much, the pigment deposits in the ink composition, or the resultant ink composition has an excessively high viscosity, so that the composition clogs a pen tip, or writes bad. On the other hand, when the content of coloring agents is too small, the ink composition fails to form writings of an appropriate darkness. Therefore, the coloring agent is contained in the ink composition usually in amounts of 1–30% by weight, preferably in amounts of 5–20% by weight.

The ink composition of the invention contains a separating agent which is an aqueous emulsion of at least one nonvolatile or only slightly volatile compound which is liquid at room temperatures and is selected from the group consiting of aliphatic carboxylic acid esters, higher hydrocarbons and higher alcohols.

The aliphatic carboxylic acid ester includes monobasic carboxylic acid esters, dibasic carboxylic acid diesters, mono- or diesters of dihydric alcohols, and mono-, di- or triesters of trihydric alcohols. More specifically, there may be used monobasic carboxylic acid esters, preferably higher fatty acid esters such as ethyl oleate, butyl laurate, hexyl laurate, isostearyl laurate, oleyl 2-ethylhexanoate, ethyl isostearate, butyl stearate, isopropyl myristate, butyl palmitate, isooctyl palmitate, isooctadecyl palmitate, isooctyl stearate and isooctadecyl stearate; dibasic acid diesters such as dodecanedioic acid dioctyl ester, dipropyl adipate, dioctyl sebacate or dioctyl azelate; dihydric alcohol esters such as propylene glycol monostearate or propyleneglycol didecanoate; and trihydric alcohol esters such as natural or synthetic fatty acid triglycerides, for example, caproic acid triglyceride, carprylic acid triglyceride, lauric acid triglyceride, 2-hexyldecanoic acid triglyceride or the like. The triglyceride may be a mixed triglyceride in which the fatty acid components are different from each other. Further, the triglyceride may be used singly or as a mixture. Fatty acid trimethylolpropane triesters such as triisostearate may also be used.

The higher hydrocarbon used as a separating agent is not specifically limited, but may be exemplified by liquid paraffin and squalane. Oxydized polyethylene wax may also be used. The higher alcohol used is also not specifically limited, but may be exemplified by hexyl alcohol, octyl alcohol and lauryl alcohol.

Aqueous emulsions of the aliphatic acrboxylic acid esters, higher hydrocarbons or higher alcohols may be prepared by conventional emulsifying methods, and are commercially available. The emulsion may be used singly or as a mixture of two or more.

The emulsion is contained in the ink composition of the invention so that the aliphatic carboxylic acid ester, higher hydrocarbon, higher alcohol or a mixture of two or more of these is contained in dry amounts of 1–20% by weight, preferably in amounts of 5–15% by weight, based on the ink composition. When the amount of the liquid compound, i.e., the ester, hydrocarbon or alcohol, is too small, the resultant ink composition is not readily erasable or seaparable from an impervious surface, whereas when the amount of the liquid compound is too large, the resultant ink composition writes bad or it stains a writing surface.

The ink composition of the invention contains a resin which is water soluble and film forming at room temperatures so that when writings have been formed and dried on an impervious writing surface, the writing has a continuous resin layer which contains the coloring agent therein and which is separated from a layer of the separating agent, thereby to provide the writing with a ready separability or a high erasability. The water soluble resin also provides the ink composition with a viscosity suitable for writing and provides writings with a suitable adhesion to a writing surface.

One of the preferred water soluble resins is by nature water soluble resins such as polyvinylpyrrolidone or polyvinylalcohol having a polymerization degree of 100–3000 and a saponification degree of not less than 50 mole %, with the latter preferred of the two. Natural water soluble resins may be used such as gum arabic.

In the invention, however, a resin which is water-solubilized and film forming at room temperatures is more preferably used as a water soluble resin in a broader sense. The water-solubilized resin is herein the specification defined as resins which are by nature water insoluble but are made water-solubilized by salt formation with inorganic or organic bases, such as alkali metal salts, e.g., sodium or potassium salts, ammonium salts or amine salts.

The water-solubilized resin usable may be exemplified by acrylic resins, vinyl acetate copolymers, polyurethane resins, styrene-maleic anhydride resins, maleic oils, maleic polybutadienes, alkyd resins, maleic alkyd resins and maleic rosin ester resins, all in the form of salts as above-mentioned. Among the above exemplified, water-solubilized vinyl acetate copolymers, alkyd resins inclusive of maleic alkyd resins, and polyurethane resins are most preferred.

The vinyl acetate copolymer usable, in particular, includes copolymers of vinyl acetate with unsaturated carboxylic acids such as acrylic acid, methacrylic acid, maleic acid, maleic anhydride, fumaric acid, itaconic acid, crotonic acid or citraconic acid. The vinyl acetate copolymer may contain further comonomers such as vinyl esters other than vinyl acetate (e.g., vinyl propionate), vinyl hydrocarbons (e.g., ethylene, propylene, butene, styrene, α-methylstyrene), acrylic or methacrylic acid esters (e.g., methyl acrylate, ethyl acrylate, butyl acrylate, methyl methacrylate, ethyl methacrylate or dimethyl maleate). The vinyl acetate copolymer may be a graft one with the monomers as above described onto polyvinyl acetates.

Preferred vinyl acetate copolymers may be exemplified by vinyl acetate-acrylic acid copolymer, vinyl acetate-methacrylic acid copolymer, vinyl acetate-styrene-acrylic acid copolymer, vinyl acetate-styrene-maleic anhydide acid copolymer, vinyl acetate-acrylic acid-methyl acrylate copolymer, vinyl acetate-methacrylic acid-methyl acrylate copolymer, vinyl acetate-acrylic acid-ethyl acrylate copolymer, vinyl acetate-methacrylic acid-methyl methacrylate copolymer and vinyl acetate-maleic anhydide copolymer. The vinyl acetate coplymers are usually water insoluble, however, the inorganic or organic salts thereof are water soluble. Theses water-solublized copolymers are commercially available.

Similarly, the water-solublized alkyd resins may be prepared by condensation of excessive unsaturated carboxylic acids with polyhydric alcohols, and salt formation with alkali metals, ammonium bases or organic amines. The water-solubilized urethane resins may be prepared by salt-formation of pendant carboxylic groups in the polymer chain with alkali metals, ammonium bases or organic amines. These water-solubilzed alkyd resins and urethane resins are also commercially available.

The water soluble or water-solubilized resin is contained in the ink composition in amounts of 0.1–15% by weight, preferably in amounts of 0.3–10% by weight, based on the ink composition. When the amount of the resin is too large, the resultant ink composition has an excessively high viscosity so that it writes bad but also writings formed therewith is not readily erased.

A further water base erasable ink composition is provided in accordance with the invention.

The ink composition comprises:
(a) water as a solvent in amounts of 50–90% by weight, preferably of 60–80% by weight;
(b) a coloring agent dispersed or dissolved in water in amounts of 1–30 % by weight, preferably of 5–20% by weight;
(c) an aqueous emulsion of at least one nonvolatile or only slightly volatile compound which is liquid at room temperatures and is selected from the group consisting of aliphatic carboxylic acid esters, higher hydrocarbons and higher alcohols in dry amounts of 1–20% by weight, preferably of 5–15% by weight, as a separating agent; and
(d) an aqueous emulsion or a hydrosol of a water insoluble resin which is film forming at room temperatures in solid amounts of 0.1–15% by weight.

The coloring agent and the separating agent have been described hereinbefore.

In this water base erasable ink composition of the invention, film forming aqueous emulsions or hydrosols of resins which are by nature water insoluble is used in place of the aforesaid water soluble resins or water-solubilized resins.

As the above by nature water insoluble resins, there may be mentioned, for example, polyvinyl acetates, vinyl acetate copolymers, alkyd resins and urethane resins, with polyvinyl acetates and vinyl acetate copolymers most preferred. Preferred examples of the latter are the same as described hereinbefore.

The emulsion or hydrosol is contained in the ink composition in dry amounts of 0.1–15% by weight, preferably in amounts of 0.3–10% by weight, based on the ink composition, based on the same reason as before described regarding water soluble or water-solubilized resins.

The emulsion or hydrosol of water insoluble resins forms a continuous resin layer which contains the coloring agent therein and which is separated from a layer of the separating agent, so that writings formed on an impervious surface is readily erasable. Further, since the resin is water insoluble, the ink composition provides highly water resistant writings, or writings readily and stably erasable under high humidity.

When desired, a mixture of water soluble or water-solubilized resins with the emulsion or hydrosol of water insoluble resins may be used in total solid amounts of 0.1–15% by weight based on the ink composition.

The ink composition of the invention may contain a water soluble polyhydric alcohol to assist the separation of writings from writing surface. The polyhydric alcohol usable includes, for example, ethylene glycol, diethylene glycol, triethylene glycol, propylene glycol, dipropylene glycol, tripropylene glycol, polyethylene glycol having a molecular weight of about 200–600, polypropylene glycol having a molecular weight of about 1000–3000, glycerine and trimethylolpropane. The polyhydric alcohol may be contained in amounts of not more than 20% by weight, preferably in amounts of not more than 10% by weight, based on the ink composition. When the amount of the polyhydric alcohol is too large, the resultant ink composition has an excessively large viscosity and writes bad.

A variety of surfactants, either anionic, nonionic, cationic or ampholytic, may also be incorporated in the ink composition as a writing separation assintance. However, polyoxyethylene carboxylic acid, sulfonic acid, sulfate or phosphate nonionic or anionic surfactants, ampholytic betaine surfactants or fluorinated surfactants are preferred. The amount of surfactants may be not more than 10 % by weight, preferably in the range of 0.2–5% by weight based on the ink composition. The use of exessive amount deteriolates the erasability of the ink composition.

The surfactant assists the separation of the oily layer from the resin layer when writings are formed. Moreover, the surfactant provides a levelling effect with writings formed but also prevents the emulsion from being unevenly distributed on a writing surface when writings are formed, so that the dried writing is evenly erasable. From these standpoints, fluorinated surfactants are most preferred.

Although the invention is not limited by any theory, however, when writings are formed on an impervious writing surface with a marking pen, and when the water has been evaporated or the writing has been dried, the resin forms a film colored with the pigment, while the emulsion of the separating agent is broken to form a continuous oily layer between the impervious writing surface and the resin film, and therefore the writing is separable or erasable from the surface by being wiped.

Lower aliphatic alcohols may be contained in the ink composition so that writings are readily dried when formed. However, the alcohol must not break the emulsion in the ink composition, and therefore the amount may be not more than 15% by weight, preferably in the range of 1–10% by weight, based on the ink composition. The preferred alcohol may be ethanol, propanol or butanol.

The ink composition may further contain any conventional additives used in water base ink compositions, such as pH controllers or anticorrosion agents.

As above set forth, the erasable ink composition of the invention is very little toxic, and is attended by very little bad and irritant smell since it is water base. Further, the ink composition of the invention contains a specific combination of a separating agent and a water soluble or water-solubilized resin, or an emulsion or a hydrosol of water-insoluble resin therein. Therefore, when writings are formed therewith on an impervious writing surface and dried, the separating agent forms a continuous oily layer on the surface, and separates the layer of resins which contains a coloring agent therein from the writing surface, and as results, the writing is readily separated from the writing surface.

In particular, the separating layer is not a solid film, but an oily one, so that when the writing is wiped only partly, the wiped portions only are erased. Further, since the separating layer is composed of nonvolatile or only slightly volatile liquid compound, writings are readily erasable after long standing.

When the ink composition contains a by nature water insoluble resin in a water-solubilized form, or more preferably as a hydrosol or an emulsion, the resin forms a colored layer which is highly water resistant as well as readily and stably erasable irrespectively of ambientnt humidity conditions.

The invention will now be described with reference to examples, however, which are not to be construed as limiting to the invention.

At first, some examples of preparations of aqueous emulsions of separating agents are described.

Reference Example 1

An amount of 67 parts by weight of water, 30 parts by weight of butyl stearate and 8 parts by weight of a nonionic surfactant (Neugen EA-120 by Daiichi Kogyo Seiyaku K. K., Japan, HLB of 12) were mixed together and emulsified with a homogenizer, to prepare an aqueous emulsion of butyl stearate.

Reference Example 2

An amount of 71 parts by weight of water, 25 parts by weight of dodecanedioic acid dioctyl ester, 0.8 parts by weight of a nonionic surfactant (Span 80 by Kao K. K., Japan) and 0.8 parts by weight of a nonionic surfactant (Tween 80 by Kao K. K., Japan) were mixed together and emulsified with a colloid mill, to prepare an aqueous emulsion of dodecanedioic acid dioctyl ester.

Reference Example 3

An amount of 65 parts by weight of water, 30 parts by weight of liquid paraffin and 5 parts by weight of a nonionic surfactant (Nonion H8-206 by Nippon Yushi K. K., Japan) were mixed together and emulsified with a colloid mill, to prepare an aqueous emulsion of the liquid paraffin.

Preparation of Ink Compositions I

Water base ink compositions were prepared as shown below. Parts (by weight) of pigment dispersions are the amount of the dispersion used to prepare 100 parts of ink compositions, and percents are those of effective (dry or solid) amounts of ingredients used in the ink composition.

| Ink Composition 1 | |
|---|---|
| Coloring Agent (carbon black dispersion[1]) | 50 parts |
| Carbon black | 7.5% |
| Resin | 1.0% |
| Water soluble acrylic resin | |
| Separating Agent | |
| Butyl stearate | 7.0% |
| Isopropyl myristate | 3.0% |
| Surfactant | |
| Nonionic | 0.5% |
| Fluorinated | 0.3% |
| Drying Assistance | 8.0% |
| Isopropanol | |
| Comparative Ink Composition 2 | |
| Coloring Agent (carbon black dispersion[2]) | 50 parts |
| Carbon black | 5.5% |
| Resin | — |

-continued

| | |
|---|---|
| None | |
| Separating Agent | |
| Butyl palmitate | 5.0% |
| Dioctyl dodecanedioate | 5.0% |
| Liquid paraffin | 3.0% |
| Surfactant | |
| Nonionic | 0.7% |
| Fluorinated | 0.2% |
| Drying Assistance | 5.0% |
| Ethanol | |
| Ink Composition 3 | |
| Coloring Agent (Special Black TU Paste[3]) | 20 parts |
| Carbon black | 5.0% |
| Resin | 2.5% |
| Polyvinyl alcohol | |
| Separating Agent | |
| Butyl isostearate | 8.0% |
| Fatty acid triglyceride | 3.0% |
| Surfactant | 0.3% |
| Fluorinated | |
| Ink Composition 4 | |
| Coloring Agent (Copper Phthalocyanine Blue[4]) | 20 parts |
| Copper phthalocyanine blue | 6.0% |
| Resin | 0.5% |
| Gum arabic | |
| Separating Agent | |
| Butyl stearate | 5.0% |
| Butyl palmitate | 3.0% |
| Dioctyl sebacate | 3.0% |
| Surfactant | |
| Aionic | 0.5% |
| Ampholytic betaine | 0.5% |
| Fluorinated | 0.3% |
| Drying Assistance | 5.0% |
| Isopropanol | |
| Ink Composition 5 | |
| Coloring Agent (Flexonyl Blue AN[5]) | 20 parts |
| Pigment | 5.0% |
| Resin | 2.0% |
| Polyvinyl alcohol | |
| Separating Agent | 8.0% |
| Isopropyl myristate | |
| Separating Assistance | 2.0% |
| Polyethylene glycol (average molecular weight of 300) | |
| Surfactant | 0.4% |
| Fluorinated | |
| Drying Assistance | 5.0% |
| Ethanol | |
| Ink Composition 6 | |
| Coloring Agent (Flexonyl Red FGR-LA[5]) | 20 parts |
| Pigment | 5.0% |
| Resin | 5.0% |
| Water soluble acrylic resin | |
| Separating Agent | |
| Dioctyl azelate | 5.0% |
| Diisopropyl adipate | 5.0% |
| Surfactant | |
| Nonionic | 0.4% |
| Anionic | 0.2% |
| Drying Assistance | 6.0% |
| Isopropanol | |
| Ink Composition 7 | |
| Coloring Agent | 5.0% |
| Blue No. 1 | |
| Resin | 3.5% |
| Polyvinyl alcohol | |

| | |
|---|---|
| Separating Agent | 10.0% |
| Butyl stearate | |
| Surfactant | 0.4% |
| Fluorinated | |
| Drying Assistance | 6.0% |
| Isopropanol | |
| Ink Composition 8 | |
| Coloring Agent (carbon black dispersion[1]) | 25 parts |
| Carbon black | 5.0% |
| Resin | 10.0% |
| Polyvinyl alcohol | |
| Separating Agent | 10.0% |
| Butyl stearate | |
| Surfactant | 2.0% |
| Nonionic | |
| Comparative Ink Composition 9 | |
| Coloring Agent (carbon black dispersion[1]) | 25 parts |
| Carbon black | 5.0% |
| Resin | 10.0% |
| Water soluble acrylic resin | |
| Separating Agent | 10.0% |
| Butyl stearate | |
| Surfactant | 2.0% |
| Nonionic | |
| Comparative Ink Composition 10 | |
| Coloring Agent (carbon black dispersion[2]) | 25 parts |
| Carbon black | 5.0% |
| Resin | — |
| None | |
| Separating Agent | 10.0% |
| Butyl stearate | |
| Surfactant | 2.0% |
| Nonionic | |

Notes:
[1] Aqueous dispersion composed of 15% by weight of carbon black, 65% by weight of water and 20% by weight of amine salts of styrene-butyl acrylate-methacrylic acid copolymer.
[2] Aqueous dispersion composed of 10% by weight of carbon black, 67% by weight of water, 20% by weight of water soluble acrylic resins, 2% by weight of ammonia water and 1% by weight of surfactants.
[3] Aqueous dispersion of carbon black.
[4] Aqueous dispersion composed of 15% by weight of copper phthalocyanine, 75% by weight of water and 10% by weight of ammonium salts of styrene-methyl methacrylate-hydroxymethyl methacrylate-acrylic acid
[5] Aqueous dispersion of pigments Writings were formed on impervious writing surfaces of enamel, and the writing was left standing at a temperature of 25° C. under a relative humidity of 60% for five minutes and for 15 days, respectively, and then wiped lightly with dry cloth, to evaluate erasability of the writing after five minutes (initial erasability) and after 15 days (standing erasability). The erasability was evaluated with the eyes: A, readily erasable; B, fairly erasable; C, only slightly erasable; and D, scarcely erasable. The results are shown in Table 1.

For comparison, the same erasability tests were carried out using conventional commercially available oil base erasable ink compositions. The results are shown in Table 1.

TABLE 1

| | | Erasability | |
|---|---|---|---|
| | | Initial | Standing |
| Conventional | 1[1]) | A | A |
| | 2[2]) | A | A |
| | 3[3]) | A | C |
| Ink Composition | 1 | A | A |
| | 2*) | B | B |
| | 3 | A | A |
| | 4 | B | C |
| | 5 | A | B |

TABLE 1-continued

| | Erasability | |
|---|---|---|
| | Initial | Standing |
| 6 | A | A |
| 7 | B | B |
| 8 | A | A |
| 9*) | B | C |
| 10*) | C | D |

Notes:
1) Contains ketones as a solvent, commercial products
2) Contains alcohols as a solvent, commercial products
*) Comparative examples The water base ink composition of the invention is comparable with the conventional oil base ones in the erasability of writings. Further, the ink composition of the invention is superior in erasability both initial and standing to the comparative examples containing no resins therein.

Preparation of Ink Compositions II

Water base ink compositions were prepared as shown below. Percents are those of effective (dry or solid) amounts of ingredients used in the ink composition. The ink composition contained an effective amount of anticorrosion agents and the balance was water. A dispersant was used to prepare a pigment dispersion and the amount thereof was also shown below.

| Ink Composition 1 | |
|---|---|
| Coloring Agent | 5.0% |
| Carbon black | |
| Dispersant | 2.0% |
| Ammonium salts of styrene-butyl acrylate-methacrylic acid | |
| Resin | 6.0% |
| Hydrosol of vinyl acetate-ethyl acrylate-acrylic acid copolymer | |
| Separating Agent | 10.0% |
| Butyl stearate | |
| Surfactant | 1.0% |
| Anionic | |

| Ink Composition 2 | |
|---|---|
| Coloring Agent | 5.0% |
| Carbon black | |
| Dispersant | 3.0% |
| Water solubilized acrylic resin | |
| Resin | 6.0% |
| Emulsion of vinyl acetate-methacrylic acid copolymer | |
| Separating Agent | |
| Butyl stearate | 5.0% |
| Dioctyl dodecanedioate | 5.0% |
| Surfactant | 0.5% |
| Anionic | |

| Ink Composition 3 | |
|---|---|
| Coloring Agent | 6.0% |
| Phthalocyanine blue | |
| Dispersant | 4.0% |
| Ammonium salts of styrene-maleic acid | |
| Resin | 6.0% |
| Emulsion of vinyl acetate-maleic acid copolymer | |
| Separating Agent | 8.5% |
| Squalane | |
| Separating Assistance | 3.0% |
| Polyethylene glycol (average molecular weight of 300) | |
| Surfactant | 1.5% |
| Ampholytic | |

| Ink Composition 4 | |
|---|---|
| Coloring Agent | 5.5% |
| Monoazo Red | |
| Dispersant | 2.5% |
| Nonionic surfactant | |
| Resin | 7.0% |
| Emulsion of polyvinyl acetate | |
| Separating Agent | |
| Lauryl alcohol | 5.0% |
| Fatty acid triglyceride | 6.0% |
| Surfactant | 1.0% |
| Nonionic | |

| Ink Composition 5 | |
|---|---|
| Coloring Agent | 4.0% |
| Carbon black as a dispersion | |
| Resin | 5.0% |
| Water-solubilized acrylic resin | |
| Separating Agent | |
| Octyl stearate | 5.0% |
| Liquid paraffin | 6.0% |
| Separating Assistance | 2.0% |
| Polyethylene glycol (average molecular weight of 300) | |
| Surfactant | 1.0% |
| Anionic | |

| Ink Composition 6 | |
|---|---|
| Coloring Agent | 5.0% |
| Carbon black as a dispersion | |
| Resin | 6.5% |
| Emulsion of polyurethane resins | |
| Separating Agent | 12.0% |
| Butyl isostearate | |
| Surfactant | 0.5% |
| Anionic | |

In the same manner as before described, initial and standing erasability of writings formed on an enamel surface were evaluated. The results are shown in Table 2.

TABLE 2

| | Erasability | |
|---|---|---|
| | Initial | Standing |
| Ink Composition 1 | A | B |
| 2 | A | A |
| 3 | A | B |
| 4 | A | A |
| 5 | B | A |
| 6 | B | B |

The water base ink composition of the invention is comparable with the conventional oil base ones in the erasability of writings.

Preparation of Ink Compositions III

The following water base ink compositions 7 to 10 were prepared. The compositions 8 to 10 were comparative examples.

| Ink Composition 7 | |
|---|---|
| Coloring Agent | |
| Carbon black | 4.0% |
| Dispersant | |
| Water-solubilized acrylic acid-styrene copolymer | 2.0% |
| Resin | |

-continued

| | |
|---|---|
| Hydrosol of vinyl acetate-methyl methacrylate-acrylic acid copolymer | 7.0% |
| Separating Agent | |
| Butyl palmitate | 10.0% |
| Surfactant | |
| Anionic | 1.0% |
| Comparative Ink Composition 8 | |
| Coloring Agent | |
| Carbon black | 4.0% |
| Dispersant | |
| Water-solubilized acrylic acid-styrene copolymer | 2.0% |
| Resin | |
| Water soluble polyvinyl alcohol | 7.0% |
| Separating Agent | |
| Butyl palmitate | 10.0% |
| Surfactant | |
| Anionic | 1.0% |
| Comparative Ink Composition 9 | |
| Coloring Agent | |
| Carbon black | 4.0% |
| Dispersant | |
| Water-solubilized acrylic acid-styrene copolymer | 2.0% |
| Resin | |
| Water soluble polyvinylpyrrolidone | 7.0% |
| Separating Agent | |
| Butyl palmitate | 10.0% |
| Surfactant | |
| Anionic | 1.0% |
| Comparative Ink Composition 10 | |
| Coloring Agent | |
| Carbon black | 4.0% |
| Dispersant | |
| Water-solubilized acrylic acid-styrene copolymer | 2.0% |
| Resin | |
| Water-solubilized styrene-maleic acid copolymer | 7.0% |
| Separating Agent | |
| Butyl palmitate | 10.0% |
| Surfactant | |
| Anionic | 1.0% |

Writings were formed on impervious writing surfaces of enamel, and the writing was left standing at a temperature of 25° C. under varied relative humidities to evaluate erasability and "elongation" of the writing when it was wiped on the writing surface. The elongation is a measure of water resistance of writing since writing is more elongated or extended on the writing surface under a high humidity when it is wiped as it is less water resistant. The elongation of writing was evaluated by four grades: A, not elongated; B: slightly elongated, but erased; C: elongated and only slightly erased; and D, remarkably elongated and scarcely erased. The results are shown in Table 3.

TABLE 3

| | Erasability | Elongation of Writings | | | |
|---|---|---|---|---|---|
| | | Relative Humidity (%) | | | |
| | | 60 | 55 | 67 | 80 |
| Ink Composition | 7 | A | A | A | A |
| Comparative | 8 | A | A | C | D |
| | 9 | B | B | D | D |
| | 10 | B | A | A | A |

The water base ink composition containing a hydrosol of a vinyl acetate copolymer forms writings readily erasable without elongation irrespectively of humidity, but the ink compositions containing water soluble resins form writings elongated by wiping under high humidity. When an ink composition contains a water-solubilized resin, writings formed therewith are not elongated by wiping, however, it is a little less erasable than the composition containing a hydrosol of a vinyl acetate copolymer.

What is claimed is:

1. A water base erasable ink composition for use in marking pens and for writing on an impervious writing surface, which consists essentially of:

(a) water as a solvent;

(b) a pigment dispersed in water in an amount of 1–30% by weight;

(c) an aqueous emulsion of a fatty acid ester which is nonvolatile or only slightly volatile and liquid at room temperatures, which functions as a separating agent, and which is selected from the group consisting of ethyl oleate, butyl laurate, hexyl laurate, isostearyl laurate, oleyl 2-ethylhexanoate, ethyl isostearate, butyl stearate, isopropyl myristate, butyl palmitate, isooctyl palmitate, isooctadecyl palmitate, isooctyl stearate and isooctadecyl stearate, in a dry amount of 5–15% by weight; and (d) a water-solubilized resin which is at least one of an acrylic resin, a vinyl acetate copolymer other than vinyl acetate-acrylic acid copolymer, a polyurethane resin, a styrene-maleic anhydride resin, a maleic oil, a maleic polybutadiene, an alkyd resin, a maleic alkyd resin and a maleic rosin ester resin, each in the form of a salt with an inorganic or an organic base, and which is film forming at room temperatures, in an amount of 0.1–15% by weight.

2. The ink composition as claimed in claim 1 wherein the water solubilized vinyl acetate copolymer is a vinyl acetate copolymer with an unsaturated carboxylic acid, and optionally with a further comonomer which is at least one of a vinyl ester other than vinyl acetate, a vinyl hydrocarbon, an acrylic acid ester, a methacrylic acid ester and dimethyl maleate.

3. The ink composition as claimed in claim 2 wherein the unsaturated carboxylic acid is at least one of acrylic acid, methacrylic acid, maleic acid, maleic anhydride, fumaric acid, itaconic acid, crotonic acid and citraconic acid.

4. The ink composition as claimed in claim 2 wherein the vinyl ester is vinyl propionate.

5. The ink composition as claimed in claim 2 wherein the vinyl hydrocarbon is at least one of ethylene, propylene, butene, styrene and α-methylstyrene.

6. The ink composition as claimed in claim 2 wherein the acrylic acid ester is at least one of methyl, ethyl and butyl esters.

7. The ink composition as claimed in claim 2 wherein the methacrylic acid ester is at least one of methyl, ethyl and butyl esters.

8. The ink composition as claimed in claim 1 wherein the water solubilized vinyl acetate copolymer is at least one of vinyl acetate-methacrylic acid copolymer, vinyl acetate-styrene-acrylic acid copolymer, vinyl acetate-styrene-maleic anhydride copolymer, vinyl acetate-acrylic acid-methyl acrylate copolymer, vinyl acetate-methacrylic acid-methyl acrylate copolymer, vinyl acetate-acrylic acid-ethyl acrylate copolymer, vinyl acetate-methacrylic acid-methyl methacrylate copolymer and vinyl acetate-maleic anhydride copolymer.

9. The ink composition as claimed in claim 1 wherein a polyhydric alcohol is present in an amount of not more than 20% by weight based on the ink composition.

10. The ink composition as claimed in claim 1 wherein a lower aliphatic alcohol is present in an amount of not more than 15% by weight based on the ink composition.

11. The ink composition as claimed in claim 1 wherein the water-solubilized resin is in an amount of 0.3–10% by weight.

12. The ink composition as claimed in claim 1 which further comprises an anionic, a nonionic, a cationic, or an ampholytic surfactant in an amount of not more than 10% by weight based on the ink composition.

13. A water base erasable ink composition for use in marking pens and for writing on an impervious writing surface, which consists essentially of:

(a) water as a solvent;

(b) a pigment dispersed in water in an amount of 1–30% by weight;

(c) an aqueous emulsion of a fatty acid ester which is nonvolatile or only slightly volatile and liquid at room temperatures, which functions as a separating agent, and which is selected from the group consisting of ethyl oleate, butyl laurate, hexyl laurate, isostearyl laurate, oleyl 2-ethylhexanoate, ethyl isostearate, butyl stearate, isopropyl myristate, butyl palmitate, isooctyl palmitate, isooctadecyl palmitate, isooctyl stearate and isooctadecyl stearate, in a dry amount of 1–15% by weight; and (d) a water soluble resin which is at least one of polyvinyl alcohol, polyvinylpyrrolidone and gum arabic and which is film forming at room temperatures, in an amount of 0.1–15% by weight.

14. The ink composition as claimed in claim 13 wherein a polyhydric alcohol is present in an amount of not more than 20% by weight based on the ink composition.

15. The ink composition as claimed in claim 13 wherein a lower aliphatic alcohol is contained in an amount of not more than 15% by weight based on the ink composition.

16. The ink composition as claimed in claim 13 wherein the water-solubilized resin is in an amount of 0.3–10% by weight.

17. The ink composition as claimed in claim 13 which further comprises an anionic, a nonionic, a cationic, or an ampholytic surfactant in an amount of not more than 10% by weight based on the ink composition.

* * * * *